United States Patent
Ramachandran et al.

(10) Patent No.: US 8,126,762 B2
(45) Date of Patent: Feb. 28, 2012

(54) METHOD FOR MANAGING AND CONTROLLING STABILITY IN BUSINESS ACTIVITY MONITORING AND MANAGEMENT SYSTEMS

(75) Inventors: Bala Ramachandran, Harrison, NY (US); Li Chen, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/061,029

(22) Filed: Apr. 2, 2008

(65) Prior Publication Data

US 2008/0183562 A1 Jul. 31, 2008

(51) Int. Cl.
*G06F 17/30* (2006.01)
(52) U.S. Cl. ...................................... 705/7.28
(58) Field of Classification Search ............... 705/7.28
See application file for complete search history.

(56) References Cited

U.S. PATENT DOCUMENTS

| | | | | |
|---|---|---|---|---|
| 7,188,169 B2* | 3/2007 | Buus et al. | ...................... | 709/224 |
| 7,813,947 B2* | 10/2010 | DeAngelis et al. | .......... | 705/7.28 |
| 2006/0167704 A1* | 7/2006 | Nicholls et al. | .................... | 705/1 |

OTHER PUBLICATIONS

Bauer "The Benefits of Corporate Performance Management", Nov. 2003, The Power of Metrics, Pages.*
White (Using Business Intelligence and Analytics to Drive the Business), Dec. 2003, Intelligence Business Intelligence, pp. 1-123.*
Melao et al (A conceptual framework for understanding business process and business process modeling), Oct. 2000, Department of management science, pp. 105-129.*
Lee et al.; "Information Distortion in a Supply Chain: The Bullwhip Effect"; Management Science, vol. 43, No. 4, Apr. 1997; pp. 546-558.
Michael Bittner; "E-Business Requires Supply Chain Event Management"; The Report on Supply Chain Management, Nov. 2000; pp. 3-28.

* cited by examiner

*Primary Examiner* — Romain Jeanty
(74) *Attorney, Agent, or Firm* — Whitham, Curtis, Christofferson & Cook, P.C.; Daniel P. Morris

(57) ABSTRACT

A stabilization methodology and system component in Business Activity Monitoring and Management systems. This enables firms to use Business Activity Management (BAM) systems to manage business activity by only responding to monitored data when the overall business performance can be improved. This enables firms to identify appropriate tradeoffs between potentially conflicting objectives while meeting business objectives. Information from BAM systems are analyzed based on models of the business process and different information filter criteria are assessed for their impact on business performance indicators. Based on this, a filter criterion is chosen which is executed by an information filter. The outputs from the information filter are used as the basis for deciding the inputs for business process execution.

21 Claims, 8 Drawing Sheets

METHOD FOR MANAGING AND CONTROLLING STABILITY IN BUSINESS ACTIVITY MONITORING AND MANAGEMENT SYSTEMS

BACKGROUND OF THE INVENTION

1. Field of the Invention

The present invention generally relates to a methodology and apparatus for managing and controlling stability in Business Activity Management (BAM) systems.

2. Background Description

Business Activity Monitoring and Management is a technology enabling the visibility and monitoring of real-time business information. Examples are (i) Sense & Respond (see G. Lin et al. "The Sense & Respond Enterprise", *OMRS Today*, April 2002, p. 34) and (ii) Supply Chain Event Management (see M. Bittner, "E-Business Requires Supply Chain Event Management", *AMR Research Report*, November 2000). The underlying value proposition of this technology is that it enables the use of real-time information to update operational policies and manage execution accordingly.

In the typical usage of Business Activity Monitoring and Management systems, enterprise information is monitored in real-time or near real-time and converted to business performance indicators which can be displayed on dashboards or other visual form to different business role players. Also, different criteria can be specified to detect situations of interest to the business role players, triggering alerts in different forms that can prompt business responses. These alerts can take multiple forms, such as pop-up messages on a computer screen, an e-mail, a mobile phone call, and the like. The persons receiving this message makes a business judgement on the severity of the alert and potential business consequences and takes appropriate steps to modify the inputs that drive business process execution.

Although updating based on real-time information can be beneficial for operational management, it need not always be. In some cases, it can result in local operational improvement, while deteriorating system-wide performance. For example, the phenomenon of demand variablility amplification in a multi-echelon supply chain (also known as The Bullwhip Effect) has been recognized in many diverse industries (see H. L. Lee, V. Padmanabhan and S. Whang, "Information Distortion In a Supply Chain: The Bullwhip Effect", *Management Science*, Vol. 43, No. 4, p. 546). Uncoordinated frequent actions, taken in response to changes in demand/supply information at the downstream sites in a supply chain, can cause excessively higher demand variability to the upstream sites, which, in turn, results in excessive inventories as one moves up the chain. A forecast-driven inventory control policy involving frequent updates is one of the key drivers of the demand variability amplification phenomenon. This raises the question of how to respond to real-time or near real-time information that is enabled by Business Activity Monitoring and Management systems in an optimal way without triggering any undesired effect on business performance.

The background described above indicates a need for stabilization mechanisms in Business Activity Monitoring and Management systems that enable the appropriate usage of monitored information, i.e., to improve business performance and not to have unintended consequences in business performance deterioration. This requires the usage of monitored information in a way, that all the instability factors, such as information distortion in the bullwhip effect case, are kept under control.

SUMMARY OF THE INVENTION

It is therefore an object of the present invention to provide a methodology that enables the analysis of information coming from Business Activity Monitoring and Management systems to determine the potential impact that responding to such information would have on the overall business performance indicators. By doing so, it ensures that the monitored data is used to improve business performance while all the instability factors are kept under control, thus stabilizing the BAM system.

This invention introduces a Stabilizer component in Business Activity Monitoring and Management. This Stabilizer component analyzes monitored data and suitably modifies the data and uses the processed data in determining the business process execution inputs. The Stabilizer component comprises the following sub-components:

1. A model for predicting the outputs of business process execution.
2. A method for evaluating policies that specify the filter characteristics and choosing a policy for implementation. The filter policies specify schemes for modification of the monitored data, which are subsequently used for determining the business process execution inputs.
3. A filter to process the monitored data according to the chosen filter policy.

The invention contemplates other ways of using the Stabilizer component in the business process execution feedback loop, including filtering and stabilizing the alerts seen on a dashboard or alerts received using other electronic medium.

This invention can help firms realize the full benefits from the visibility of real-time or near real-time business performance indicators. In sharp contrast to prior art techniques, this method enables the usage of monitored information to update business process execution inputs only when such an update can result in potential improvement in business process performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the following description, we assume the existence of a Business Process Monitoring and Management system that probes different enterprise events and monitors different enterprise performance indicators. The performance indicators could include metrics both at business and information technology (IT) levels. This invention is not limited by the specific details of a particular Business Process Monitoring and Management system. We assume the existence of one or more mechanisms for accessing the monitored information and alerts, including, but not limited to dashboard portals, e-mail, personal digital assistants (PDAs), cell phones, and the like. We also assume the existence of processes or mechanisms that use the monitored information to identify and modify inputs that drive Business Process execution. This invention is not limited by the specific details of Business Process execution, including use of workflow engines.

Figure 1:
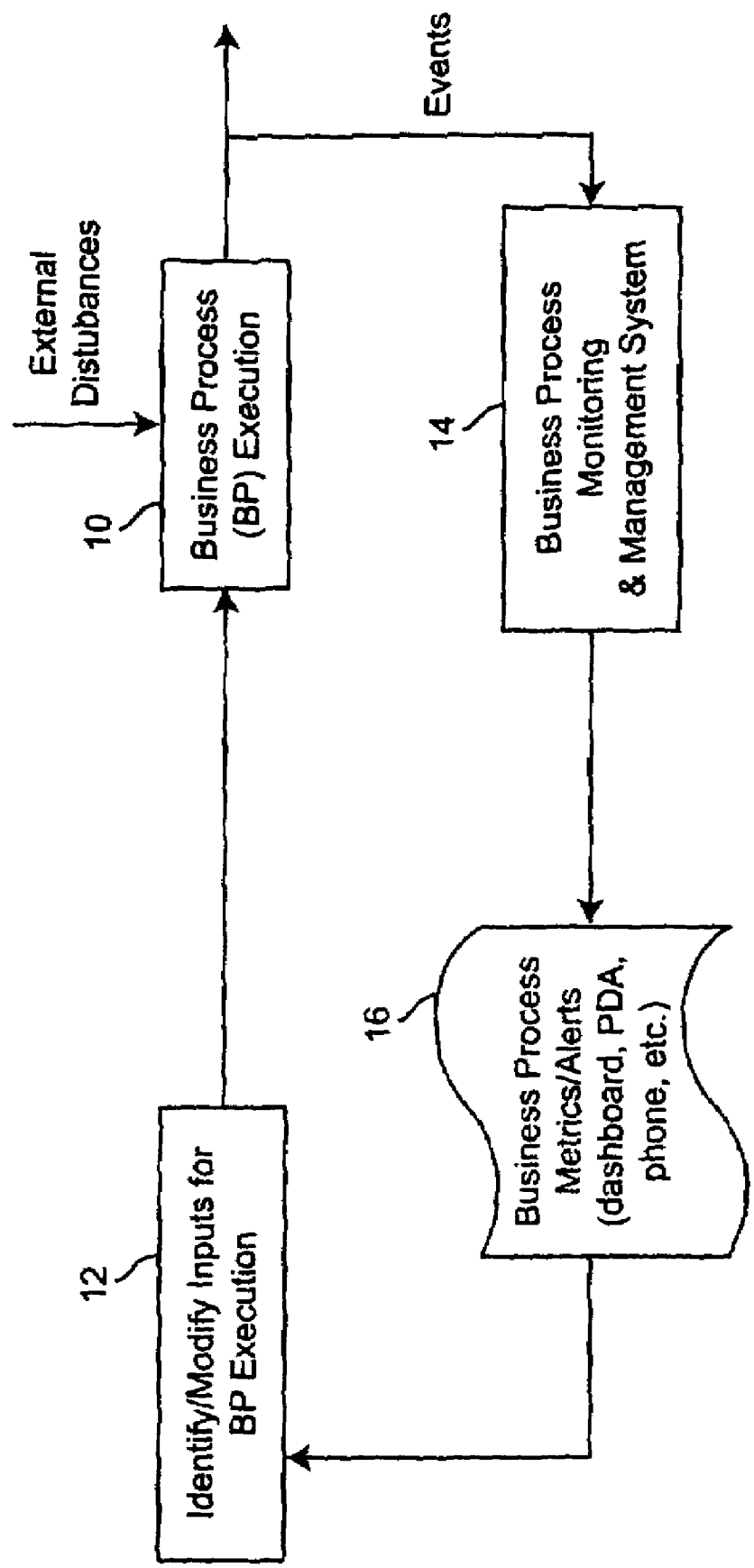
FIG. 1 is a block diagram showing a representative process for using Business Activity Monitoring and Management systems.

Referring now to the drawings, and more particularly to FIG. 1, there is shown a representative process for using Business Activity Monitoring and Management systems. The Business Process (BP) execution 10 receives inputs 12 which are modified for BP execution by a feedback loop. The output events from the BP execution 10 is fed back for modifying inputs to Business Process execution 12, by a Business Process Monitoring and Management system 14 that depicts Business Process Metrics 16 and produces alerts. More particularly, enterprise information is monitored in real-time or near real-time and converted to business performance indicators which are displayed to different business role players. A person receiving a message makes a business judgment and takes appropriate steps to modify the inputs 12 that drive the BP execution 10. The problem is that updating the inputs on real-time information can potentially result in an amplification effect, making the feedback loop unstable.

A novel element of this invention is the intelligent use of monitored data to drive changes in input data 12 for Business Process (BP) execution 10.

Figure 2:
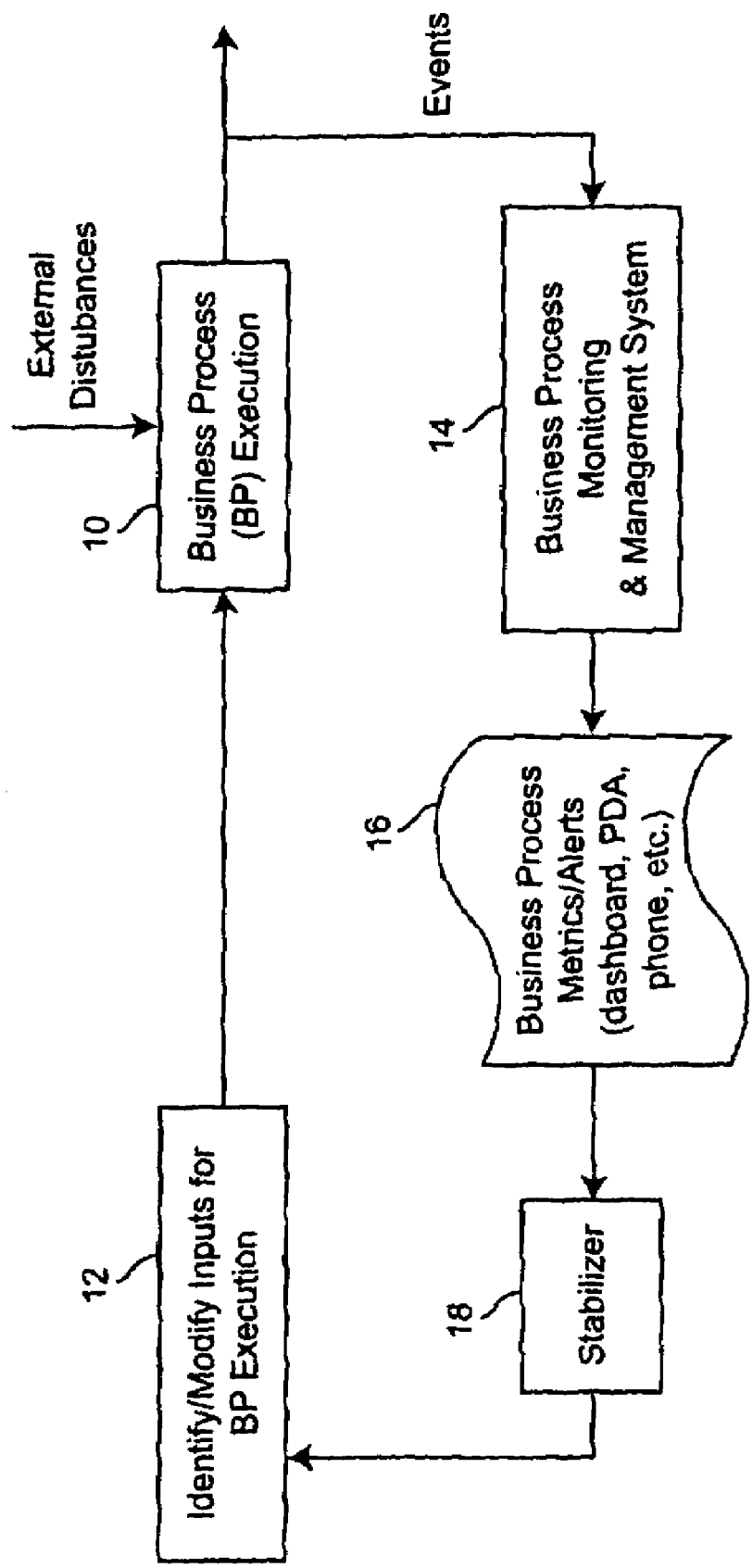
FIG. 2 is a block diagram showing the process for using Business Activity Monitoring and Management systems with a Stabilizer according to the present invention.

FIG. 2 shows the process of FIG. 1 with the added component of a Stabilizer 18 in the feedback loop between the business process monitoring and management system 14 and the method for modifying business process execution inputs 12. The Stabilizer 18 analyzes the monitored data and suitably processes the data which is used in determining the business process execution inputs 12. The implementation of the Stabilizer 18 requires the following components: (a) predictive models for the business process, (b) filter policies, and (c) an information filter. This invention does not require that all the above components be implemented as a single computer program or that it run on a single computation device.

Figure 3:
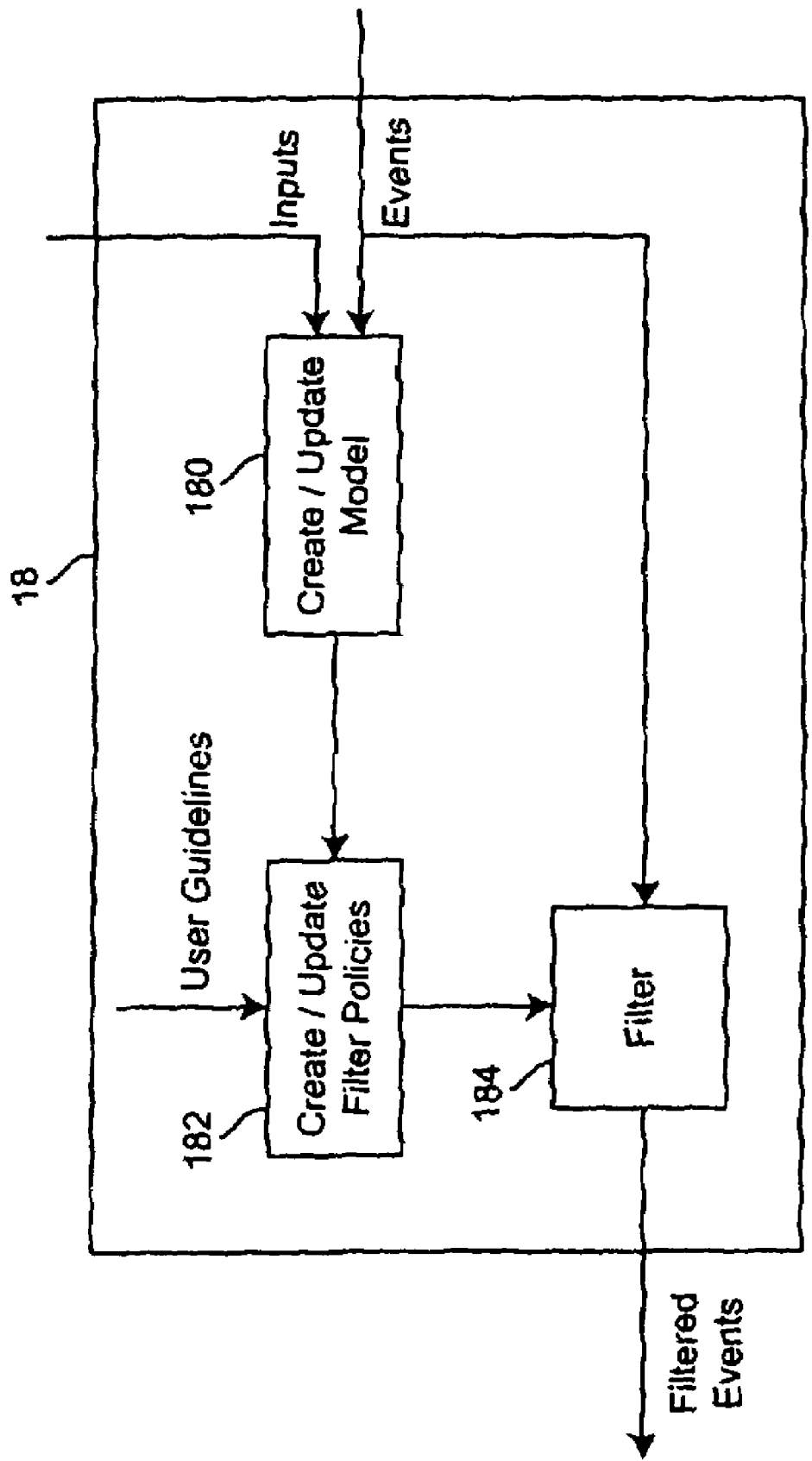
FIG. 3 is a block diagram showing the essential components of the Stabilizer shown in FIG. 2.

As shown in FIG. 3, the Stabilizer 18 comprises a model 180 for predicting the outputs of the BP execution 10. This model can be updated using historical data on business process inputs and outputs. Business process events are used along with User Guidelines by a method 182 to evaluate policies that specify filter characteristics. The output of the method 182 is a filter policy for processing of the monitored data in order to be used for determining the business process execution inputs 12. The filter policy is selected from a number of filter policies that specify schemes for processing of monitored data. A filter 184 implements the selected filter policy and processes the monitored data based on a chosen filter policy.

Figure 4:
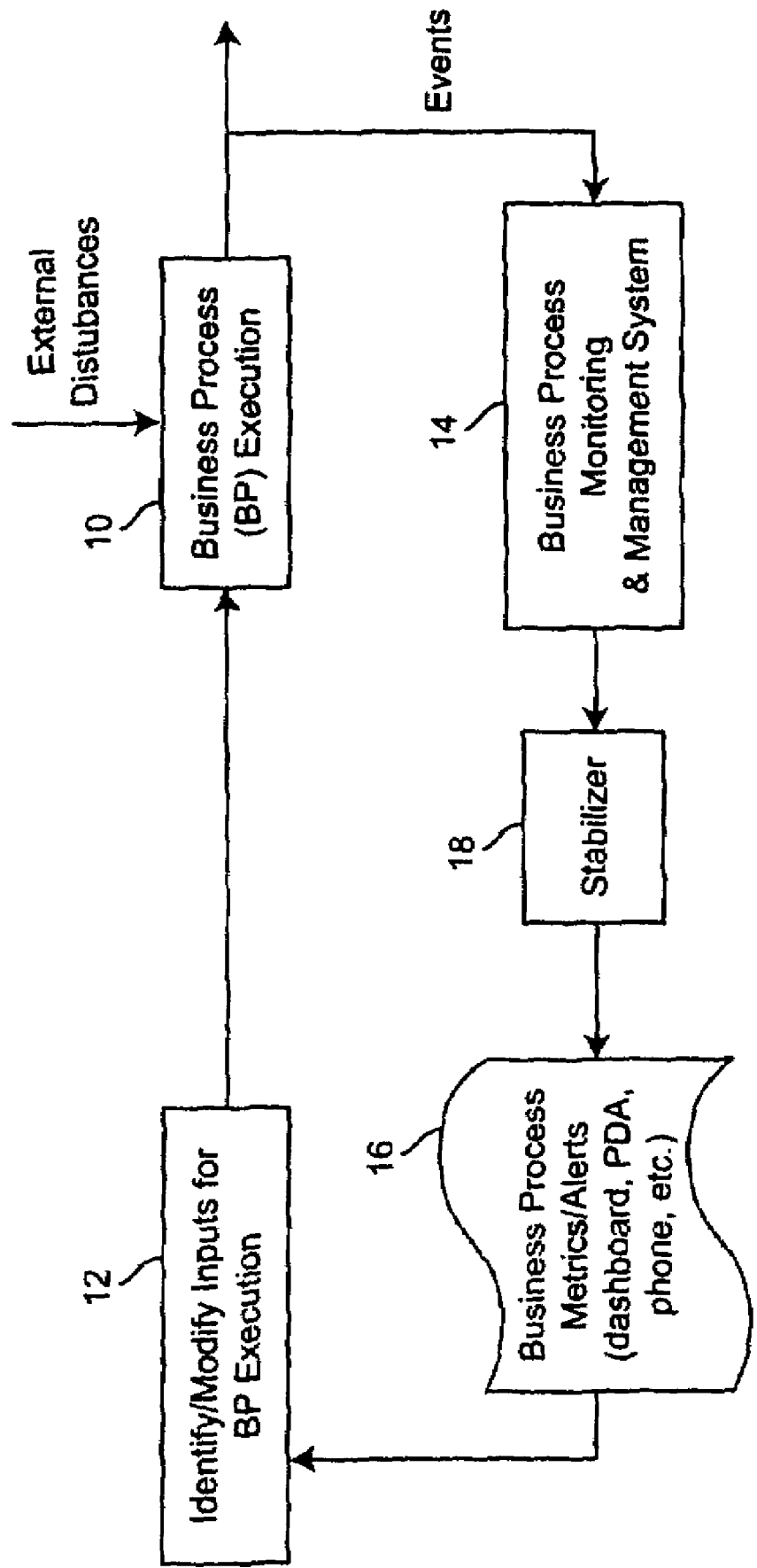
FIG. 4 is a block diagram, similar to FIG. 2, showing an alternative process of using Business Activity Monitoring and Management systems with a Stabilizer.

It will be appreciated that the Stabilizer 18 can be located in the feedback loop shown in FIG. 2 in a different location. For example, as shown in FIG. 4, the Stabilizer 18 is shown between the Business Process Monitoring and Management system 14 and the depiction of business process Metrics and alerts 16.

Figure 5:
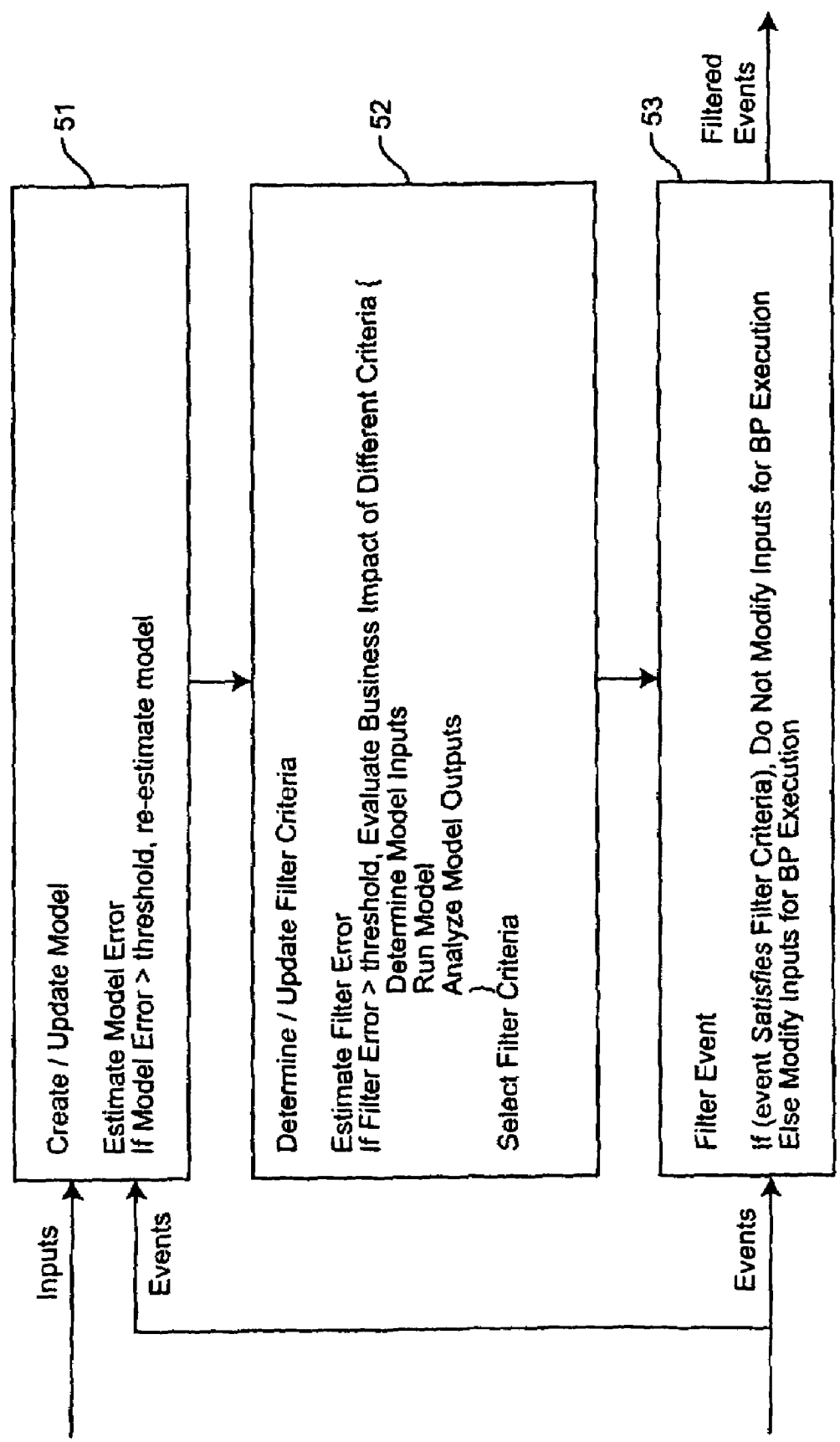
FIG. 5 is a flow diagram showing a high level description of the procedures implemented in the Stabilizer.

FIG. 5 describes the essential functions performed in the Stabilizer 18. First, business process events are cleansed to obtain the process data. The input data that drives business process execution is used to predict process performance indicators, using models of the business process. Different elements of the business process may be captured together in one model or in multiple models. This invention is not limited by the specific details of a model of the business process. This can take several forms that include models of the business process that can be simulated to predict performance indicators and statistical process models that correlate business process inputs with outputs and domain-specific models. The predictive model can also be used to determine the impact of changing business process execution inputs on overall business performance indicators. Such prediction can be used to determine whether or not to create an exception for the normal timing of activities in a business process cycle. Based on the predicted data and the measured actuals, the model error is estimated. If the model error is larger than a user specified tolerance, the model is re-estimated. This may involve tuning the parameters of the current model or identifying a new model structure, followed by estimation of model parameters. Business process experts may be involved in the decision of when a model needs to be re-estimated, in the choice of new model structures and in deciding the parameters for the process model. The "model update" step 51 is performed at a pre-specified frequency. Alternatively, this can be triggered automatically based on certain business rules or can also be triggered manually by participants performing certain business process roles.

The "determine filter criteria" step 52 can be executed in many ways, including manual input of filter criteria. We describe one way below. Past monitored data that was filtered to determine input data for business process execution is compared with actual data from business process measurements using the business process model to estimate the "ideal" filtered data that should have been used to determine business process execution. The actual filtered data that was used in the past is compared with the "ideal" filtered data to estimate the filter error. If the filter error is larger than a user specified tolerance, the filter policies need to be re-estimated. This is done following these steps:

Identify a set of filter policies. This invention is not limited by the specific details of a filter policy. This can take several forms including business rules and statistical algorithms.

Run the predictive model for each model for each of these filter policies and determine the business process outputs.

Examine the predicted outputs to identify the most appropriate filter policy.

The "determine filter criteria" step 52 could optionally include an optimization procedure that is used to optimize the filter criteria based on specified business objectives and constraints. The "determine filter criteria" step 52 is performed at a pre-specified frequency. Alternatively, this can be triggered automatically based on certain business rules or can also be triggered manually by participants performing certain business process roles. The filter criteria may further be reviewed and revised by business process experts.

The "filter event" step 53 filters the events and/or monitored data by executing the filter policies determined in the "determine filter criteria" step 52 described above. This can be manifested in an information filter that allows some monitored data to pass through to elicit some business response and other data to be rejected, so as not to elicit any business response.

Figure 6:
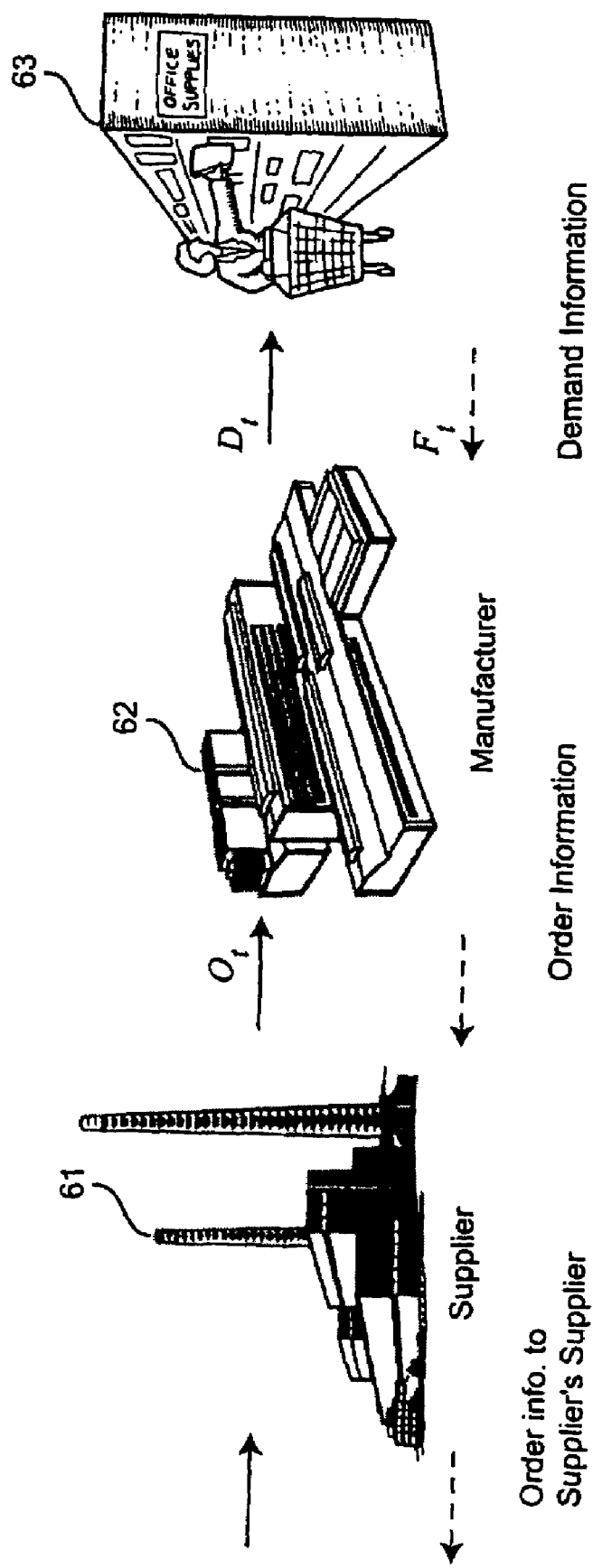
FIG. 6 is a pictorial representation showing a two-stage supply chain that is used as an example to the illustrate the Stabilizer according to the present invention.

As a specific example, we consider a simple two-level supply chain that consists of one manufacturer and one supplier, as generally depicted in FIG. 6. The manufacturer 61 makes and sells one product, the raw materials for which are obtained from the supplier 62. The manufacturer 61 forecasts demands 63 for a specific time horizon, which forms the basis for the manufacturer's production planning process. The production plan is used to drive the Materials Requirements Planning process to generate supplier requirements. The manufacturer 61 shares supplier requirements, along with demand forecasts and production plans, with the supplier 62. This information acts as the basis for the supplier to plan production.

These data inputs to the supplier 62 undergo constant churn in response to changes in supply-demand balance at the manufacturer 61. For example, the manufacturer production unit might suffer an unplanned outage or there can be a sudden shift in the demand. This triggers changes in the supplier data inputs very frequently. At the manufacturer's end, demand is constantly changing, as customers can place new orders or cancel existing orders. Supply commitments also change based on changes in the suppliers plan. Responding to every event from business process execution might result in repeated changes, sometimes more than once. On the other hand, not processing some events might lead to unintended and potentially undesirable consequences in business performance and in fact, defeats the whole purpose of Business Activity Monitoring. As visibility to these business process information is enabled by Business Activity Monitoring and Management systems, how should the consumers of this information respond? This invention provides the capability to Business Activity Monitoring systems to enable users to intelligently respond to real-time or near real-time changes in monitored information.

We describe here a specific method for monitoring changes in demand, developing a demand model, observing and predicting supply chain performance and choosing a particular filter policy. This invention is by no means limited by the details of this specific method.

External demand for the single item occurs at the manufacturer. The underlying demand process for the item is modeled as an independent normal variable with unknown trend, t, as defined below:

$$D_t = \mu_t + \epsilon_t$$

Here $D_t$ is the observed demand at time period t, $\mu_t$ is the underlying demand trend and $e_t$ is the random shock on demand. One way to model random demand shocks is to model $e_t$ as an independent and identically distributed random variable (otherwise referred to as an i.i.d. variable), with mean 0 and variance $\sigma_\epsilon^2$. The statistics of $\epsilon_t$ can alternatively be estimated based on historical demand information. Each site reviews its inventory level and replenishes its inventory from an upstream site every period. The replenishment lead times from the supplier's supplier to the supplier, and from the supplier to the manufacturer, are in constant periods and denoted by K and L, respectively.

First, the timing of events for the manufacturer's ordering process is the following: (1) at the beginning of period t, the manufacturer places an order, $O_t$, to the supplier; (2) Next, the goods ordered L periods ago arrive. (3) Finally, demand is realized, and the available inventory is used to meet the demand. Excess demand is backlogged, and a penalty cost is charged on shortfall demand if stock-out occurs. Let h, p denote the unit inventory holding cost and unit stock-out penalty cost accounted at the manufacturer, respectively.

Next, the supplier handles his ordering process as follows: (1) before the beginning of period t, the goods ordered K periods ago arrive. (2) At the beginning of period t, the supplier receives and ships the required order quantity $O_t$ to the manufacturer. If the supplier does not have enough stock to fill this order, then we assume that the supplier will meet the shortfall by obtaining some units from an "alternative" source, with additional cost representing the penalty cost to this shortfall. Thus, the inventory system at the supplier resembles a system with back orders, and the supplier guarantees supply to the manufacturer. (3) Supplier reviews his inventory level and places an order, $R_t$, to his external supplier. Let H, P denote the unit inventory holding cost and unit stock-out penalty cost assessed at the supplier site, respectively. The manufacturer adopts the m-period modified order-up-to policy and the supplier uses the base case order-up-to policy (forecasts fully updated every period). The supplier's external supplier is perfectly reliable. This invention is by no means limited to the details of this particular business process.

When there is no information sharing, the supplier 62 receives only information about the retailer's order quantity $O_t$. Therefore, the supplier 62 treats the order quantity $O_t$ from the manufacturer 61 as an independent normal random variable. Also, the supplier 62 has his own forecast for the underlying trend of orders from the manufacturer. We can show that $$E(O_t) = \mu_{t+L}$$

Let $G_{t,s}$ be the supplier's forecast at period t for the unknown trend of orders that the manufacturer will place at period s, with $t \leq s$, we assume the supplier's forecast process evolves as follows:

$$G_{t,s} = \mu_{s+L} + \eta_{t,s}, \text{ for } t \leq s$$

where $\eta_{t,s}$ is an i.i.d. normal variable with mean 0 and variance $\tau_{s-t}^2$. We assume $\eta_{t,s}$ is independent of actual order quantity $O_s$.

Therefore, the optimal order-up-to level ($T_t$) for supplier is $$T_t = \sum_{s=t+1}^{t+k} G_{t,s} + Z.\tau_e$$

where, $$\tau_e = \sqrt{K.Var(O_t) + \sum_{i=1}^{K} \tau_i^2}$$

$$Z = \Phi^{-1}(P/(P+H))$$

where $\Phi(\cdot)$ is the cumulative standard normal distribution and $Var(O_t)$ is defined as:

$$Var(O_t) = E\{Var(O_t|I_t)\} + Var\{E(O_t|I_t)\}$$

These variances can be calculated based on different demand models.

Under this model framework, we have the manufacturer's long run average cost is, $$C_M = (h+p)\Phi(z)\frac{1}{m}\sum_{i=0}^{m-1}\sigma_{e,i}$$

where $\phi(\cdot)$ is the standard normal density function and z, and $\sigma_{e,i}$ are defined as:

$$z = \Phi^{-1}(p/(p+h))$$

$$\sigma_{e,i}^2 = (L+1)\sigma_e^2\sum_{i=i}^{L}\sigma_k^2 + i.\sigma_L^2$$

And the supplier's long run average cost is, $$C_S = (H+P)\cdot\phi(Z)\cdot\tau_e$$

where, Z and e are defined as above.

It is easy to show that CM is increasing in m, and CS is decreasing in m. Therefore, there exists an optimal m*, $1<m^*<\infty$, such that the total supply chain cost is minimized. Therefore, when there is no information sharing between the supply chain members, the total supply chain cost performance will improve as the downstream member updates his inventory target level less frequently. And there exists an optimal updating frequency to minimize the total supply chain cost performance.

Figure 7:
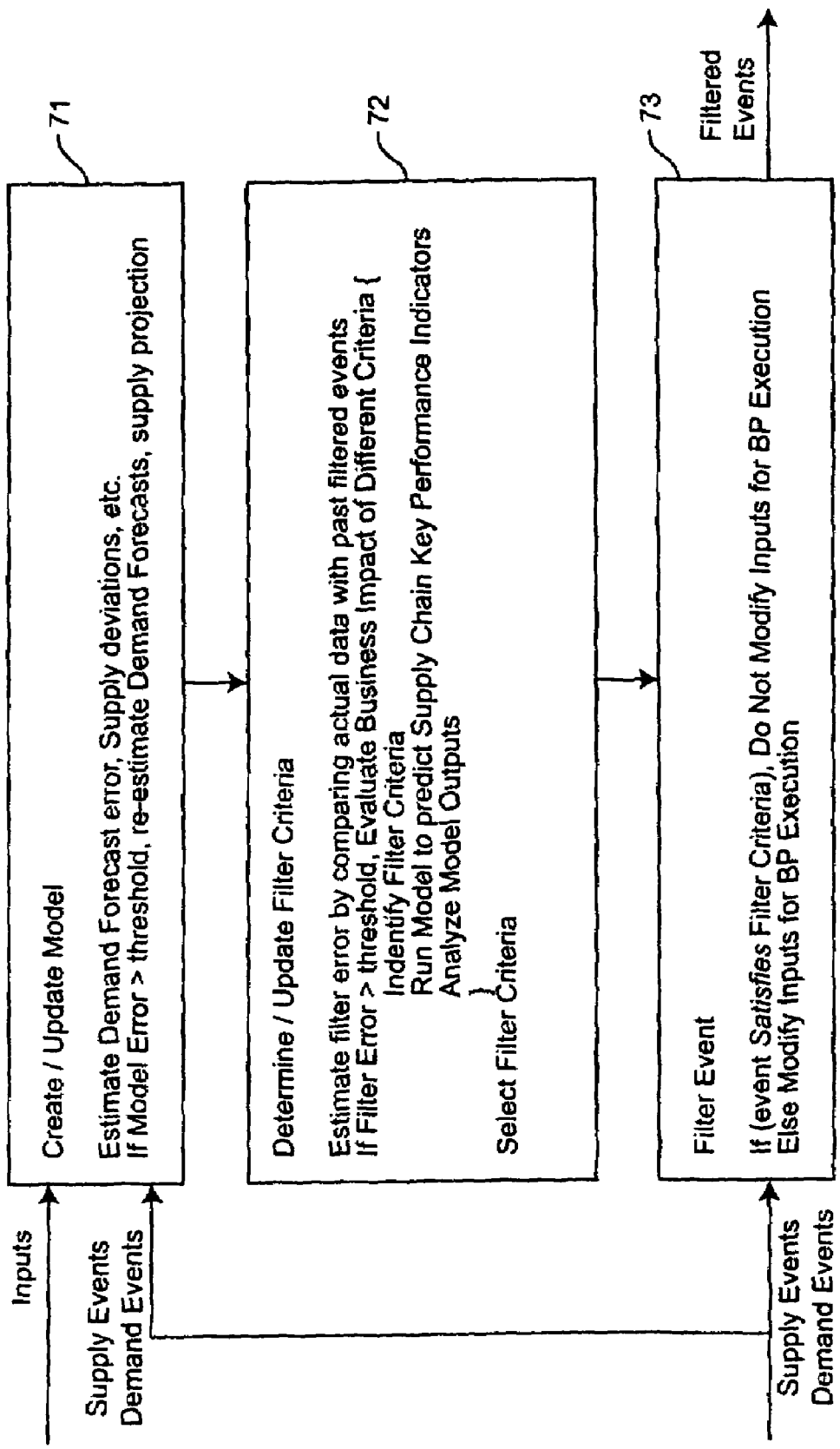
FIG. 7 is a flow diagram showing how the Stabilizer works in the Supply Chain Monitoring and Management scenario shown in FIG. 6.

FIG. 7 shows the procedures implemented by Stabilizer 18 of the Business Activity Monitoring and Management system for the Manufacturer and Supplier in this specific example. In the "model update" step 71, the parameters of the demand model and supply model are updated. The frequency of this update can either be specified by the user or the update can be triggered based on business rules for the events. Typically, this frequency has to be much larger than the typical planning time scales. In the "determine filter criteria" step 72, the performance of the updated model is evaluated for different inventory update frequencies. The performance evaluation is based on overall supply chain costs estimated by the model. The filter execution in this simple case is basically to update inventory policy based on the frequency determined in the "model update" step 71.

Figure 8:
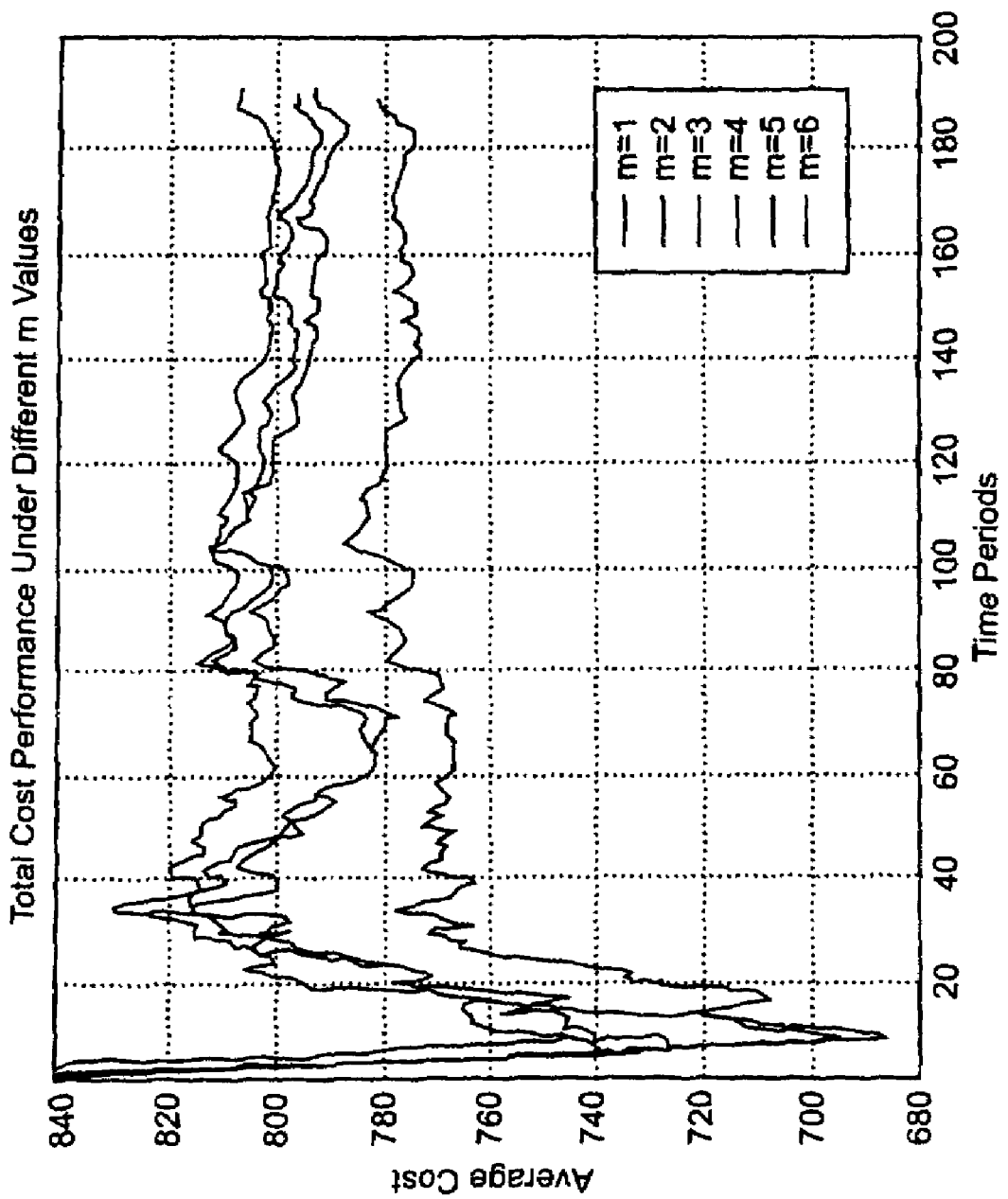
FIG. 8 is a graph showing simulation results confirming existence of an optimal response frequency for a two echelon supply chain model.

FIG. 8 shows simulation results that confirm the existence of an optimal response frequency (m=5) for this two echelon supply chain model.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for stabilizing a Business Activity Monitoring and Management (BAM) system including dashboard portals that display to different business role players comprising supply chain members, comprising the computer-implemented steps of:
by a Business Process execution system on a computation device, receiving inputs from the dashboard portals of the different supply chain members and modifying the received inputs for execution by a feedback loop within which is located a stabilizer, the stabilizer having stored therein: (1) a predictive model for predicting the outputs of the Business Process execution system, the model being an updatable model, (2) a set of filter policies, and (3) an information filter that executes the filter policies;
by the Business Process execution system on the computation device, outputting of output events, which are fed back for modifying inputs to the Business Process execution system;
depicting Business Process Metrics and producing alerts seen on the dashboards of different supply chain members;
operating the stabilizer on the computation device to analyze monitored data;
operating the information filter on the computation device, including allowing only some monitored data to pass through to elicit a business response, wherein Business Process execution inputs are only updated using monitored information when such an update results in potential improvement in Business Process performance.

2. The method according to claim 1, wherein the predictive model is used to determine an impact of changing business process execution inputs on overall business performance indicators.

3. The method according to claim 2, wherein the business impact determination is used to determine whether or not to create an exception for the normal timing of activities in a business process cycle.

4. The method according to claim 3, wherein monitored data that is not responded to is used to evaluate potential benefits to value chain partners.

5. The method according to claim 4, wherein estimates of potential benefits to value chain partners are used in business negotiations and contract formulations, to share the resulting benefits among value chain partners.

6. The method according to claim 1, wherein the step of implementing filter policies is manifested in an information filter that allows some monitored data to pass through to elicit some business response and other data to be rejected, so as not to elicit any business response.

7. The method according to claim 6, wherein the filter is incorporated in a computer system or any other suitable electronic device.

8. The method according to claim 1, wherein business impact determination is used to perform trade-off analysis between conflicting business objectives.

9. The method according to claim 8, wherein business impact estimates are used to manage supply chains.

10. The method according to claim 1, wherein the models used for business impact determination are used to determine the optimal response frequency for business responses to monitored information.

11. An apparatus for stabilizing a Business Activity Monitoring and Management (BAM) system including dashboard portals that display to different business role players comprising supply chain members comprising:
by a Business Process execution system on a computation device, receiving inputs from the dashboard portals of the different supply chain members and modifying the received inputs for execution by a feedback loop within which is located a stabilizer, the stabilizer having stored therein: (1) a predictive model for predicting the outputs of the Business Process execution system, the model being an updatable model, (2) a set of filter policies, and (3) an information filter that executes the filter policies by the Business Process execution system on the computation device, outputting of output events, which are fed back for modifying inputs to the Business Process execution system;

depicting Business Process Metrics and producing alerts seen on the dashboards of different supply chain members;

operating the stabilizer on the computation device to analyze monitored data;

operating the information filter on the computation device, including allowing only some monitored data to pass through to elicit a business response, wherein Business Process execution inputs are only updated using monitored information when such an update results in potential improvement in Business Process performance.

12. The apparatus according to claim 11, wherein the predictive model is used to determine an impact of changing business process execution inputs on overall business performance indicators.

13. The apparatus according to claim 12, wherein the business impact determination is used to determine whether or not to create an exception for the normal timing of activities in a business process cycle.

14. The apparatus according to claim 13, wherein monitored data that is not responded to is used to evaluate potential benefits to value chain partners.

15. The apparatus according to claim 14, wherein estimates of potential benefits to value chain partners are used in business negotiations and contract formulations, to share the resulting benefits among value chain partners.

16. The apparatus according to claim 11, wherein the step of implementing filter policies is manifested in an information filter that allows some monitored data to pass through to elicit some business response and other data to be rejected, so as not to elicit any business response.

17. The apparatus according to claim 16, wherein the filter is incorporated in a computer system or any other suitable electronic device.

18. The apparatus according to claim 11, wherein business impact determination is used to perform trade-off analysis between conflicting business objectives.

19. The apparatus according to claim 18, wherein business impact estimates are used to manage supply chains.

20. The apparatus according to claim 11, wherein the models used for business impact determination are used to determine the optimal response frequency for business responses to monitored information.

21. A method for stabilizing a Business Activity Monitoring and Management (BAM) system including dashboard portals that display to different business rote players comprising:

supply chain members, comprising the computer-implemented steps of:

by a Business Process execution system on a computation device, receiving inputs from the dashboard portals of the different supply chain members and modifying the received inputs for execution by a feedback loop within which is located a stabilizer, the stabilizer having stored therein: (1) a predictive model for predicting the outputs of the Business Process execution system, the model being an updatable model, (2) a set of filter policies, and (3) an information filter that executes the filter policies;

by the Business Process execution system on the computation device, outputting of output events; which are fed back for modifying inputs to the Business Process execution system;

depicting Business Process Metrics and producing alerts seen on the dashboards of different supply chain members;

operating the stabilizer on the computation device to analyze monitored data;

operating the information filter on the computation device, including allowing only some monitored data to pass through to elicit a business response, wherein Business Process execution inputs are only updated using monitored information when such an update results in potential improvements in Business Process Performance.

* * * * *

UNITED STATES PATENT AND TRADEMARK OFFICE
CERTIFICATE OF CORRECTION

| | | |
|---|---|---|
| PATENT NO. | : 8,126,762 B2 | Page 1 of 1 |
| APPLICATION NO. | : 12/061029 | |
| DATED | : February 28, 2012 | |
| INVENTOR(S) | : Bala Ramachandran and Li Chen | |

It is certified that error appears in the above-identified patent and that said Letters Patent is hereby corrected as shown below:

In column 1 of the Title page, please insert:

-- Related U.S. Application Data

(63) Continuation of application No. 10/843,451, filed on May 12, 2004, now abandoned. --

In column 1 of the specification, under the title of the invention and before the Background of the Invention, please insert:

-- CROSS-REFERENCE TO RELATED APPLICATIONS

This application is a continuation of U.S. Patent Application Serial Number 10/843,435, filed May 12, 2004, now abandoned, and which is incorporated herein by reference. --

Signed and Sealed this
Seventeenth Day of September, 2013

Teresa Stanek Rea
*Deputy Director of the United States Patent and Trademark Office*